United States Patent
Park

(10) Patent No.: US 9,357,610 B2
(45) Date of Patent: May 31, 2016

(54) LED LIGHTING SYSTEM AND METHOD OF CONTROLLING THE SAME

(71) Applicant: SAMSUNG ELECTRO-MECHANICS CO., LTD., Suwon-Si, Gyeonggi-Do (KR)

(72) Inventor: Young Seo Park, Suwon-Si (KR)

(73) Assignee: SOLUM CO., LTD, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/273,394

(22) Filed: May 8, 2014

(65) Prior Publication Data

US 2015/0156845 A1    Jun. 4, 2015

(30) Foreign Application Priority Data

Dec. 2, 2013   (KR) .......................... 10-2013-0148240

(51) Int. Cl.
  *H05B 33/08*  (2006.01)
  *H05B 37/02*  (2006.01)
  *H05B 39/04*  (2006.01)

(52) U.S. Cl.
  CPC ........ *H05B 33/0854* (2013.01); *H05B 33/0815* (2013.01); *H05B 37/0227* (2013.01); *H05B 39/042* (2013.01); *Y02B 20/44* (2013.01)

(58) Field of Classification Search
  CPC .... H05B 37/0245; H05B 37/00; H05B 37/02; H05B 37/0218; H05B 33/0854; Y02B 20/44
  USPC ................. 315/153, 158, 149, 291, 308, 307, 315/185 S, 247, 224, 209 R
  See application file for complete search history.

(56) References Cited

U.S. PATENT DOCUMENTS

| | | | | |
|---|---|---|---|---|
| 2006/0044800 | A1* | 3/2006 | Reime | 362/276 |
| 2010/0301774 | A1* | 12/2010 | Chemel et al. | 315/297 |
| 2010/0315247 | A1* | 12/2010 | Tseng | 340/628 |
| 2012/0062123 | A1* | 3/2012 | Jarrell et al. | 315/131 |
| 2012/0123637 | A1* | 5/2012 | Funayama et al. | 701/36 |
| 2012/0153868 | A1* | 6/2012 | Gu et al. | 315/307 |
| 2013/0038225 | A1* | 2/2013 | Brian et al. | 315/159 |
| 2014/0001961 | A1* | 1/2014 | Anderson et al. | 315/153 |
| 2014/0354179 | A1* | 12/2014 | Newton et al. | 315/297 |
| 2014/0368324 | A1* | 12/2014 | Seifert | 340/435 |

FOREIGN PATENT DOCUMENTS

| | | | |
|---|---|---|---|
| KR | 10-2011-0027337 A | 3/2011 | |
| KR | 10-2013-0005769 A | 1/2013 | |

* cited by examiner

*Primary Examiner* — Tuyet Vo
(74) *Attorney, Agent, or Firm* — McDermott Will & Emery LLP

(57) ABSTRACT

A light emitting diode (LED) lighting system may include a plurality of LED modules and a server. The plurality of LED modules can include LED lighting devices and provide a human detection signal and distance information regarding a distance from a human, in the case of human detection, respectively. The server may control the LED lighting devices upon receiving the human detection signal and the distance information from the plurality of LED modules. The server may compare the distance information with a pre-set reference distance and controls brightness of the LED lighting devices according to the comparison results.

3 Claims, 5 Drawing Sheets

LED LIGHTING SYSTEM AND METHOD OF CONTROLLING THE SAME

CROSS-REFERENCE TO RELATED APPLICATION

This application claims the benefit of Korean Patent Application No. 10-2013-0148240 filed on Dec. 2, 2013, with the Korean Intellectual Property Office, the disclosure of which is incorporated herein by reference.

BACKGROUND

The present disclosure relates to a light emitting diode (LED) lighting system and a method of controlling the same.

LED lighting reduces power consumption by 50% or more while having a lifespan three times longer or more as compared to existing fluorescent lamps and allows uniform illumination distribution to be maintained. Also, LED lighting devices may be advantageously combined with IT control systems to develop various smart lighting systems.

The term Permanent Supplementary Artificial Lighting of Interiors (PSALI) refers to artificial illumination assisting natural lighting within a building in which natural lighting is not able to provide a sufficient level of illumination or a satisfactory atmosphere. Namely, in a location in which natural lighting is insufficient, illumination is configured in consideration of PSALI.

In such cases, however, since lighting needs to be continuously operated due to problems such as user safety, or the like, energy may be wasted. As a solution, lighting being automatically turned on and off through body sensing may be installed, but frequent on and off switching of lighting may reduce a life span of light fixtures, and since lighting may be suddenly turned on, users may suffer dazzle.

The following Related Art Document relates to an intelligent lighting control method, disclosing a technique of controlling an ON/OFF operation of an output load according to sensed input power, whether a person is present in a room, or in an illumination environment. However, this related art does not disclose such a technique of sensing a distance to a human and a movement and a direction of a human and controlling brightness of respective LED illumination devices within a plurality of LED illumination devices, based on the sensed information, as in the present disclosure.

RELATED ART DOCUMENT

Korean Patent Laid-Open Publication No. 10-2013-0005769

SUMMARY

Some embodiments of the present disclosure may provide a light emitting diode (LED) lighting system capable of controlling brightness of a respective LED lighting device included in a plurality of LED modules upon sensing information regarding a distance to a human and information regarding movement of a human and directionality thereof, and a method of controlling the same.

According to some embodiments of the present disclosure, a light emitting diode (LED) lighting system may include: a plurality of LED modules including LED lighting devices, and providing a human detection signal and distance information regarding a distance from a human, in the case of human detection, respectively; and a server controlling the LED lighting devices upon receiving the human detection signal and the distance information from the plurality of LED modules. The server may compare the distance information with a pre-set reference distance and may control brightness of the LED lighting devices according to the comparison results.

Each of the plurality of LED modules may include: a passive infrared ray (PIR) sensor detecting a human to generate a human detection signal; a distance detection sensor determining a distance to the human to generate distance information; and a first wireless communications module providing at least one of the human detection signal and the distance information to the server.

Each of the plurality of LED modules may further include: a motion detection sensor detecting human movement to generate movement information; and a direction detection sensor detecting a movement direction of the human to generate the direction information.

The server may control brightness of the LED lighting devices by reflecting the movement information and the direction information in the distance information provided by the distance detection sensor.

The server may include: a memory unit storing a pre-set reference distance; a second wireless communications module receiving at least one of the human detection signal and the distance information from the plurality of LED modules; a comparison/calculation unit comparing and calculating the distance information and the reference distance; and a server controller controlling brightness of the LED lighting devices according to the calculation results from the comparison/calculation unit.

When a distance value of the distance information is longer than the reference distance, the server may control output of the LED lighting device with a first brightness value, and when the distance value of the distance information is shorter than the reference distance, the server may control output of the LED lighting device with a second brightness value, and the first brightness value may be less than the second brightness value.

According to some embodiments of the present disclosure, a light emitting diode (LED) lighting system may include: at least one LED module including an LED lighting device, and determining whether a human is detected, and generating information regarding a distance from the human, movement information of the human, and direction information of the human; and a server comparing the distance information with a pre-set reference distance in the case of human detection, generating a first brightness value, and correcting the first brightness value according to the movement information and the direction information to generate a second brightness value. The server may control output of the LED lighting device included in the at least one LED module according to the second brightness value.

The at least one LED module may include: a passive infrared ray (PIR) sensor detecting a human to generate a human detection signal; a distance detection sensor detecting a distance to the human to generate the distance information; a motion detection sensor determining human movement to generate the movement information, a direction detection sensor detecting a movement direction of the human to generate the direction information; and a first wireless communications module providing at least one of the human detection signal, the distance information, the movement information, and the direction information to the server according to a pre-set wireless communications scheme.

The server may include: a second wireless communications module receiving the human detection signal, the distance information, the movement information, and the direction information according to a pre-set wireless communications scheme; a memory unit storing the pre-set reference distance; a comparison/calculation unit including a first brightness value generating unit comparing the distance information with the pre-set reference distance to generate the first brightness value and a second brightness value generating unit correcting the first brightness value according to the movement information and the direction information to generate a second brightness value; and a server controller controlling output of the LED lighting device according to the second brightness value.

The LED module may further include: an illumination sensor determining ambient brightness of the human to generate ambient brightness information.

The server may correct the second brightness value upon receiving the ambient brightness information to generate a third brightness value, and may control output of the LED lighting device according to the third brightness value.

According to some embodiments of the present disclosure, a method of controlling a light emitting diode (LED) lighting system may include: detecting a human, by a passive infrared ray (PIR) sensor, to generate a human detection signal; determining, by a distance detection sensor, a distance to the human upon receiving the human detection signal, to generate distance information; receiving, by a server, the human detection signal and the distance information; comparing, by the server, the distance information with a pre-set reference distance; and controlling, by the server, brightness of an LED lighting device according to the comparison results.

The method may further include: detecting, by the PIR sensor, human movement to generate movement information; and detecting, by a direction detection sensor, a movement direction of the human to generate direction information.

The method may further include: receiving, by the server, the movement information and the direction information; and controlling brightness of the LED lighting device by reflecting the movement information and the direction information.

The controlling of brightness of the LED lighting device may include: generating a first brightness value according to the comparison results; correcting the first brightness value according to the movement information and the direction information to generate a second brightness value; and controlling output of the LED lighting device with the second brightness value.

The controlling of brightness of the LED lighting device may include: when a distance value of the distance information is longer than the reference distance, controlling output of the LED lighting device with a first brightness value, and when the distance value of the distance information is shorter than the reference distance, controlling output of the LED lighting device with a second brightness value greater than the first brightness value.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
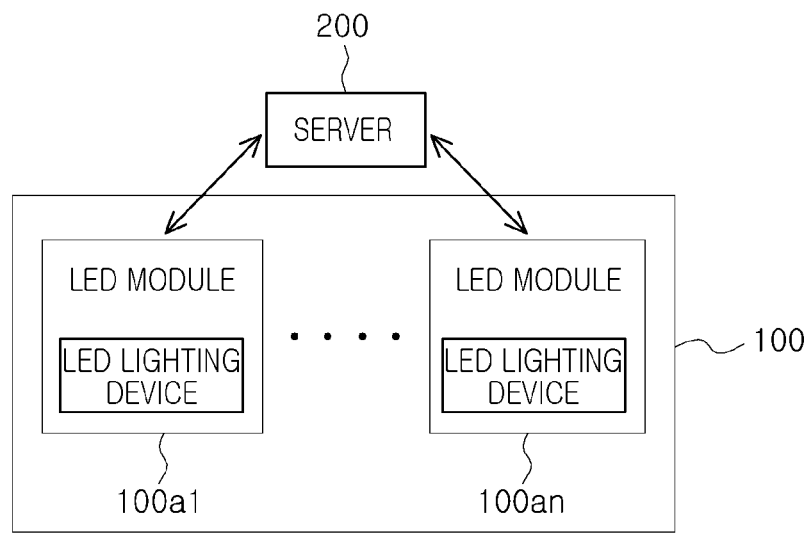
FIG. 1 is a block diagram illustrating a light emitting diode (LED) lighting system according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram illustrating a light emitting diode (LED) lighting system according to an exemplary embodiment of the present disclosure.

Referring to FIG. 1, an LED lighting system according to an exemplary embodiment of the present disclosure may include a plurality of LED modules 100 and a server 200.

The plurality of LED modules 100 may respectively include an LED lighting device 110, and when a human is sensed, the plurality of LED modules 100 may provide a human detection signal and information regarding a distance to the human to the server 200.

The server 200 may receive the human detection signal and the distance information from the plurality of respective LED modules 100 and control the LED lighting device 110. In this case, the server 200 may compare the distance information with a pre-set reference distance and may control brightness of the LED lighting device 110 according to the comparison result.

Brightness of the plurality of respective LED modules 100 may be controlled to be different according to the distance information based on the distance from the human, and hereinafter, an LED module 100a1 included in the plurality of LED modules 100 will be described in detail with reference to FIG. 2. In this case, the plurality of respective LED modules 100 may have a configuration identical to that of the LED module 100a1.

Figure 2:
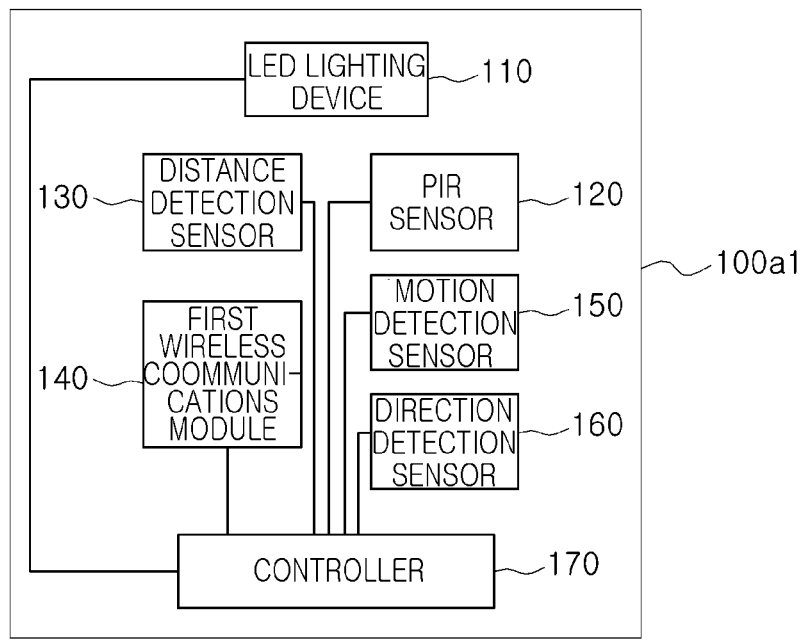
FIG. 2 is a block diagram illustrating an exemplary embodiment of an LED module of the LED lighting system illustrated in FIG. 1.

FIG. 2 is a block diagram illustrating an exemplary embodiment of an LED module 100a1 of the LED lighting system illustrated in FIG. 1.

The LED module 100a1 may include an LED lighting device 110, a human detection sensor (i.e., a passive infrared ray (PIR) sensor) 120, a distance detection sensor 130, a first wireless communications module 140, a motion detection sensor 150, a direction detection sensor 160, and a controller 170.

Here, the LED module 100a1 may be positioned in an indoor area in which natural lighting is not sufficient, and a plurality of LED modules 100a1 may be installed according to a size of an indoor space and a location.

Meanwhile, the PIR sensor 120 may sense a human to generate a human detection signal, and provide the generated human detection signal to the server 200 through the first wireless communications module 140. Also, the PIR sensor 120 may provide the human detection signal to the distance detection sensor 130 to allow the distance detection sensor 130 to determine a distance from the human.

Upon receiving the human detection signal, the distance detection sensor 130 may determine a distance to the human and generate distance information. The distance information may be provided to the server 200 through the first wireless communications module 140. In this case, the distance information may be a distance between the LED module 100a1 and the human, and the server 200 may control brightness of the LED lighting 110 based on the distance information. This will be described in detail hereinafter.

The motion detection sensor 150 may sense a motion of a human, generate movement information, and provide the generated movement information to the server 200 through the first wireless communications module 140. Upon receiving the movement information, the server 200 may determine whether a human has moved. In this case, in a case in which the human detection signal is provided but it is determined that the human does not move, the server 200 may determine that the person exists without a movement, and thus, the server 200 may control maintaining of output without turning off power of the LED lighting device 110.

The direction detection sensor 160 may detect a movement direction of the human to generate direction information. The direction information may be provided to the server 200 through the first wireless communications module 140, and the server 200 may control brightness of the plurality of LED modules 100 existing in the direction in which the person moves, according to the direction information. This will be described in detail with reference to FIGS. 5 and 6 hereinafter.

The first wireless communications module 140 may transmit data to and receive data from a second wireless communications module 220 (See FIG. 4) included in the server 200 according to a pre-set wireless communications scheme. In this case, the data may include a human detection signal, distance information, movement information, and direction information. Also, the pre-set wireless communications scheme may include Wi-Fi, Bluetooth™, and ZigBee™ communications schemes.

Figure 3:
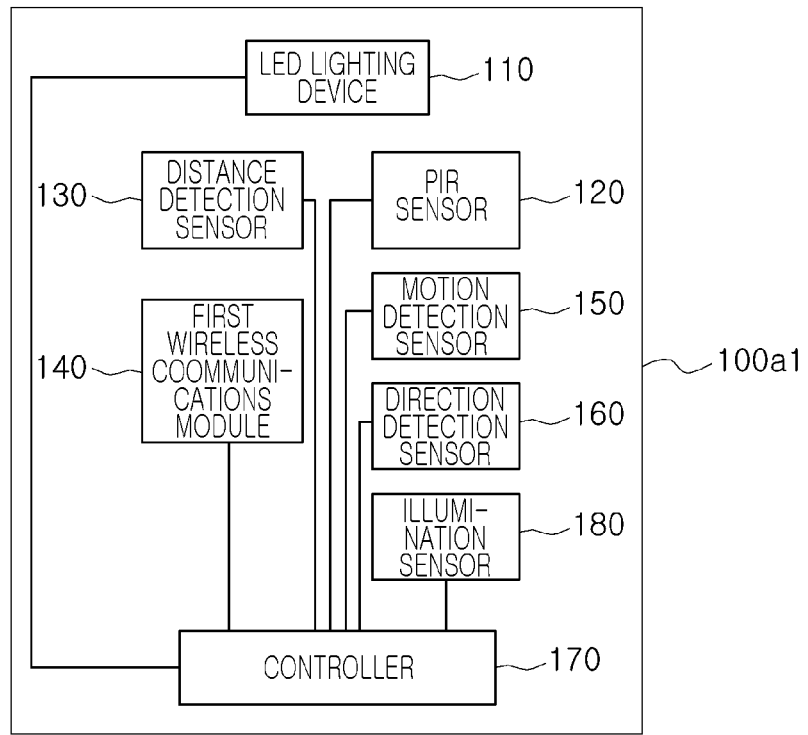
FIG. 3 is a block diagram illustrating another exemplary embodiment of an LED module of the LED lighting system illustrated in FIG. 1.

FIG. 3 is a block diagram illustrating another exemplary embodiment of an LED module 100a1 of the LED lighting system illustrated in FIG. 1.

The LED module 100a1 may further include an illumination sensor 180. The illumination sensor 180 may determine brightness around a human to generate ambient brightness information, and the server 200 may receive the ambient brightness information and control brightness of the LED lighting device included in the plurality of respective LED modules 100 based on the received ambient brightness information.

Figure 4:
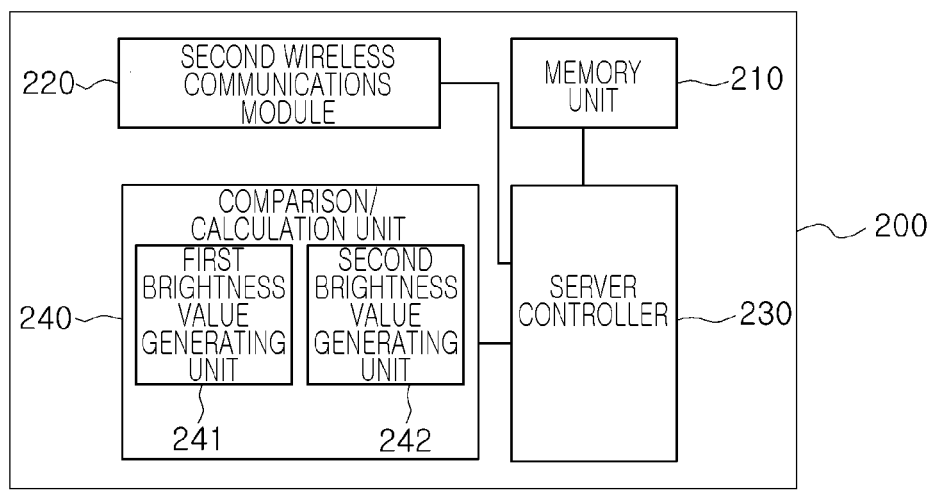
FIG. 4 is a block diagram illustrating an exemplary embodiment of a server of the LED lighting system illustrated in FIG. 1.

FIG. 4 is a block diagram illustrating an exemplary embodiment of a server 200 of the LED lighting system illustrated in FIG. 1.

The server 200 may include a memory unit 210, a second wireless communications module 220, a server controller 230, and a comparison/calculation unit 240. Also, the comparison/calculation unit 240 may include a first brightness value generating unit 241 and a second brightness value generating unit 242.

The second wireless communications module 220 may receive a human detection signal, distance information, movement information, and direction information from the first wireless communications module 140 according to a pre-set wireless communications scheme.

In this case, the human detection signal, the distance information, the movement information, and the direction information may be stored in the memory unit 210, and a pre-set reference distance compared with the distance information may also be stored in the memory unit 210.

The first brightness value generating unit 241 of the comparison/calculation unit 240 may compare the distance information with the pre-set reference distance stored in the memory unit 210 to generate a first brightness value.

Thereafter, the second brightness value generating unit 242 may receive the first brightness value and correct the first brightness value by reflecting the direction information and the movement information, and may generate a second brightness value through the correction.

The server controller 230 may control output of the LED lighting device 110 from the LED module 100a1 through a wireless communications scheme of the second wireless communications module 220 according to the generated second brightness value.

Also, the server controller 230 may correct the second brightness value according to ambient brightness information generated by the illumination sensor 180 of the LED module 100a1 to generate a third brightness value, and may control output of the LED lighting device 110 of the LED module 100a1 through the third brightness value.

This will be described in detail with reference to FIGS. 5 through 9.

Figure 5:
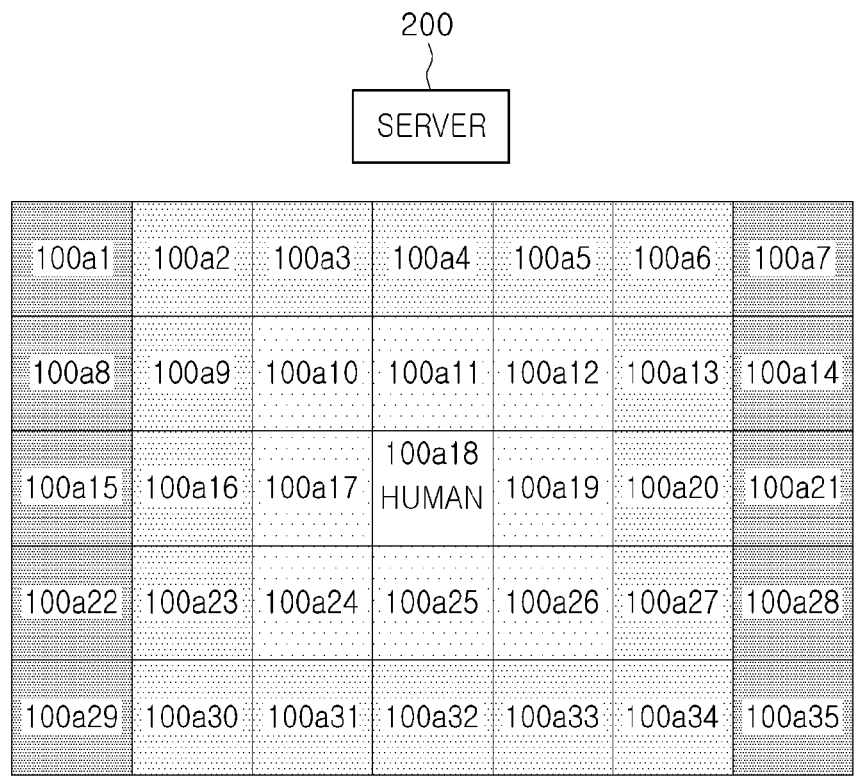
FIG. 5 is a view illustrating an operation of an LED lighting system according to an exemplary embodiment of the present disclosure.

FIG. 5 is a view illustrating an operation of an LED lighting system according to an exemplary embodiment of the present disclosure.

Figure 6:
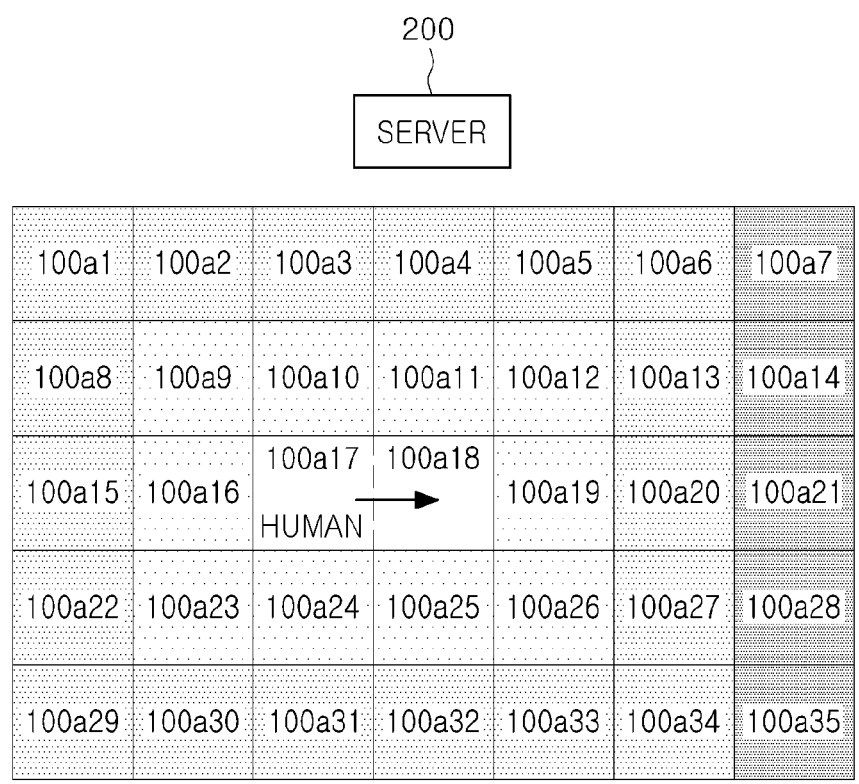
FIG. 6 is a view illustrating an operation of the LED lighting system illustrated in FIG. 5 when human movement is sensed.

FIG. 6 is a view illustrating an operation of the LED lighting system illustrated in FIG. 5 when human movement is sensed.

Figure 7:
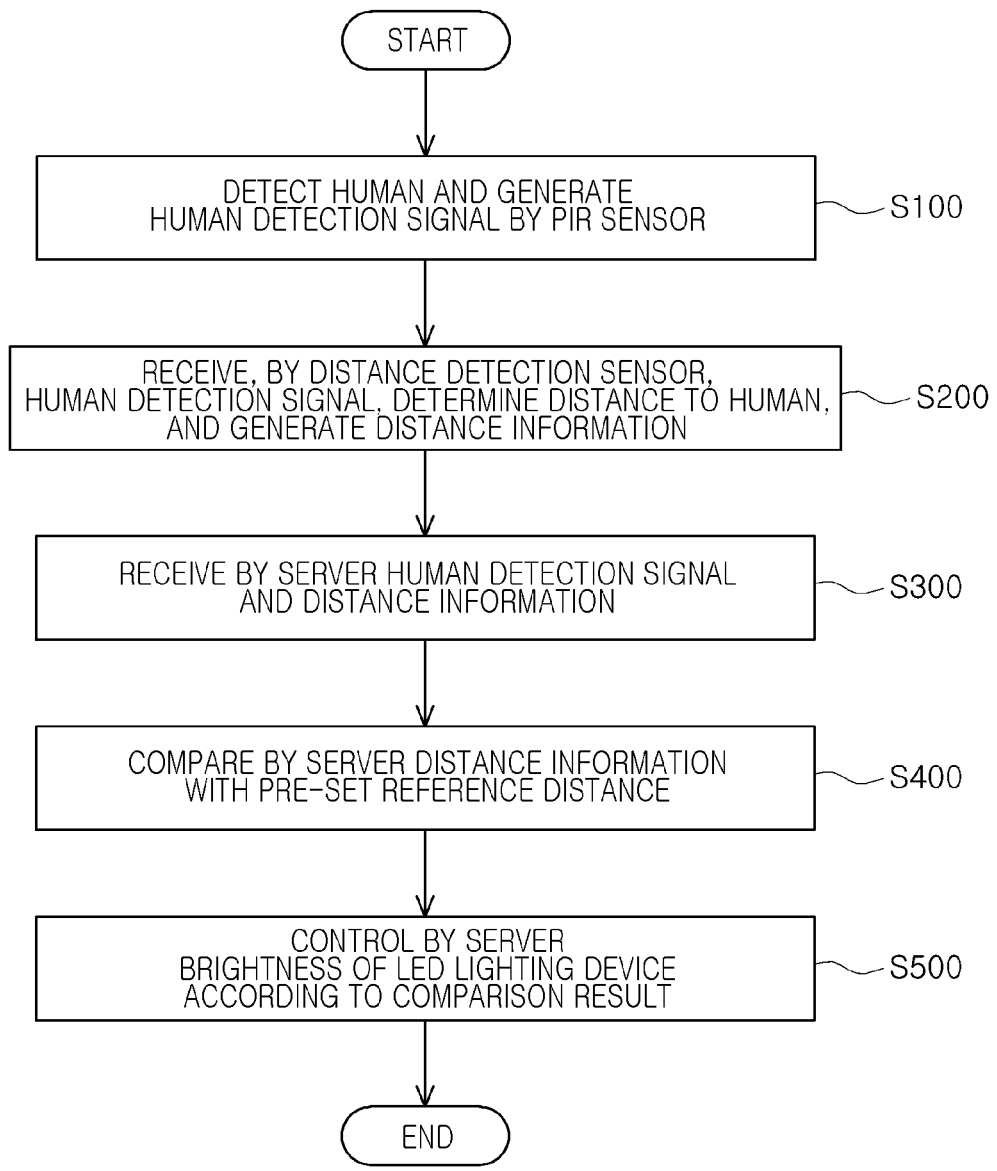
FIG. 7 is a flow chart illustrating a method of controlling an LED lighting system according to an exemplary embodiment of the present disclosure.

FIG. 7 is a flow chart illustrating a method of controlling an LED lighting system according to an exemplary embodiment of the present disclosure.

Figure 8:
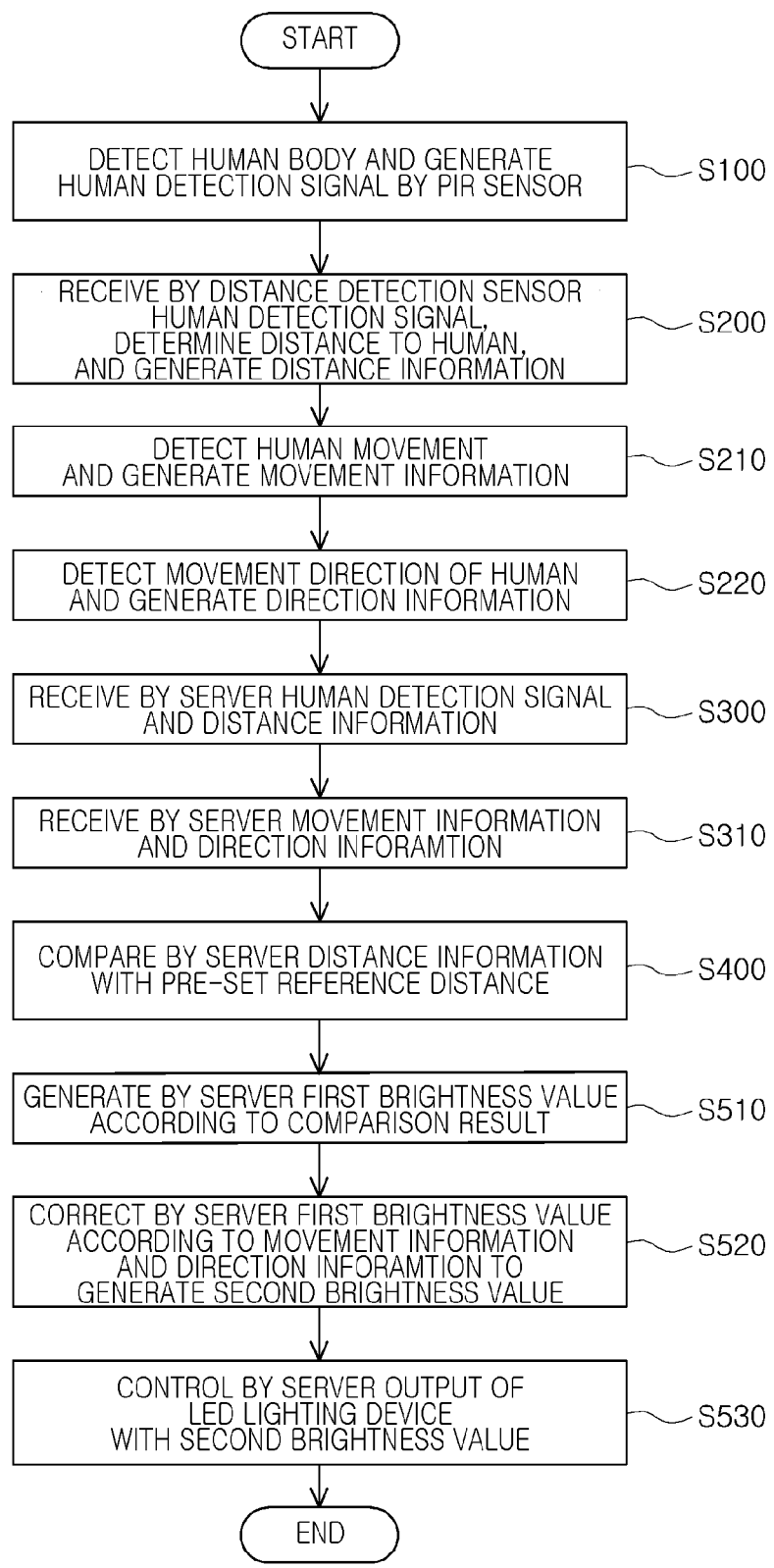
FIG. 8 is a flow chart illustrating a method of controlling an LED lighting system according to an exemplary embodiment of the present disclosure.

FIG. 8 is a flow chart illustrating a method of controlling an LED lighting system according to an exemplary embodiment of the present disclosure.

The LED lighting system according to the exemplary embodiment of the present disclosure may be installed in an indoor area in which natural lighting is not sufficient, and may include a plurality of LED modules 100 and the server 200.

Referring to FIGS. 5 through 7, the PIR sensor included in the plurality of respective LED modules 100 may detect a human body to generate a human detection signal (S100). Thereafter, the PIR sensor may provide the human detection signal to the distance detection sensor included in an LED module thereof, and the respective distance detection sensor may calculate a distance to the human to generate distance information (S200).

Thereafter, the respective distance detection sensor included in the respective LED modules 100a1 to 100an may provide the distance information to the server 200 (S300), and the server 200 may compare respective distance information with the pre-set reference distance stored in the memory unit 210 (S400). Thereafter, the server 200 may control brightness of the LED lighting device included in the respective LED modules 100a1 to 100an according to the comparison results.

Referring to FIG. 5, the server 200 may control the LED lighting device included in LED modules 100a10 to 100a12, 100a17 to 100a19, and 100a24 to 100a26 in proximity to the human to output maximum brightness.

Also, the server 200 may control the LED lighting device included in LED modules 100a2 to 100a6, 100a9, 100a13, 100a16, 100a20, 100a23, 100a27, and 100a30 to 100a34 at a relative medium distance to output medium brightness. Based on the same principle, the server 200 may control LED lighting device included in LED modules 100a1, 100a7, 100a8, 100a14, 100a15, 100a21, 100a22, 100a28, 100a29, and 100a35 relatively far from the human body to output minimum brightness.

A method of controlling brightness values of respective LED lighting devices included in the plurality of LED modules 100 according to distance information will be described in detail with reference to FIGS. 5, 6, and 8. The motion detection sensor, the direction detection sensor, or the illumination sensor included in each of the plurality of LED modules 100 may sense and generate movement information, direction information, and ambient brightness information (S210 and S220), and the server 200 may be provided with the movement information, direction information, and ambient brightness information from each of the LED modules 100a1 to 100a35 (S310).

Thereafter, the server 200 may compare the distance information with the pre-set reference distance (S400) and generate a first brightness value according to the comparison results (S510). Also, the server 200 may correct the first brightness value by reflecting the movement information, the direction information, and the ambient brightness information in the first brightness value to generate a second brightness value (S520). Thereafter, the server 200 may control brightness of the LED lighting device included in the respective LED modules 100a1 to 100a35 with the second brightness value.

Referring to FIG. 6, when the human moves from a region in which the LED module 100a17 is placed to a region of a different LED module 100a18, the server 200 may adjust brightness of LED modules which have provided the movement information and direction information, among the respective LED modules 100a1 to 100a35, with the second brightness value to control output of a respective LED lighting device.

Namely, in FIG. 6, the LED modules 100a9, 100a16, and 100a23 are far away from the human, so the server 200 may adjust brightness of respective LED lighting devices included in the LED modules 100a9, 100a16, and 100a23 such that it is darker. Conversely, the server 200 may adjust brightness of respective LED lighting devices included in the LED modules 100a12, 100a19, and 100a26 which are closer to the human, with the second brightness value provided by reflecting the movement information and direction information of the human such that it is brighter.

The server 200 may control brightness of the LED lighting device included in the plurality of respective LED modules 100 such that it does not cause inconvenience such as dazzling or glare, when a person moves, by determining a movement of the person, a movement direction, and distance information based on such movement and direction information.

In the case of the LED lighting system and the method of controlling the same according to exemplary embodiments of the present disclosure, a waste of unnecessarily consumed power may be prevented, and when a user moves, a width of intensity of illumination that the user feels may be significantly reduced to thus reduce fatigue of the user's eyes and increase user convenience.

While exemplary embodiments have been shown and described above, it will be apparent to those skilled in the art that modifications and variations could be made without departing from the spirit and scope of the present disclosure as defined by the appended claims.

What is claimed is:

1. A light emitting diode (LED) lighting system comprising:
    at least one LED module including an LED lighting device, and determining whether a moving body is detected, and generating information regarding a distance from the moving body, movement information relating to the moving body, and directional information relating to the moving body; and
    a server comparing the distance information with a pre-set reference distance in the case of moving body detection, generating a first brightness value, and correcting the first brightness value according to the movement information and the directional information to generate a second brightness value,
    wherein the at least one LED module comprises an illumination sensor determining ambient brightness of the moving body to generate ambient brightness information, and
    wherein the server corrects the second brightness value upon receiving the ambient brightness information to generate a third brightness value, and controls output of the LED lighting device included in the at least one LED module according to the third brightness value.

2. The LED lighting system of claim 1, wherein the at least one LED module comprises:
    a passive infrared ray (PIR) sensor detecting a moving body to generate a moving body detection signal;
    a distance detection sensor detecting a distance to the moving body to generate the distance information;
    a motion detection sensor determining moving body movement to generate the movement information,
    a direction detection sensor detecting a movement direction of the moving body to generate the directional information; and
    a first wireless communications module providing at least one of the moving body detection signal, the distance information, the movement information, and the directional information to the server according to a pre-set wireless communications scheme.

3. The LED lighting system of claim 1, wherein the server includes:
    a second wireless communications module receiving the moving body detection signal, the distance information, the movement information, and the directional information according to a pre-set wireless communications scheme;
    a memory unit storing the pre-set reference distance;
    a comparison/calculation unit including a first brightness value generating unit comparing the distance information with the pre-set reference distance to generate the first brightness value and a second brightness value generating unit correcting the first brightness value according to the movement information and the directional information to generate a second brightness value; and
    a server controller controlling output of the LED lighting device according to the third brightness value.

* * * * *